Figure 1:
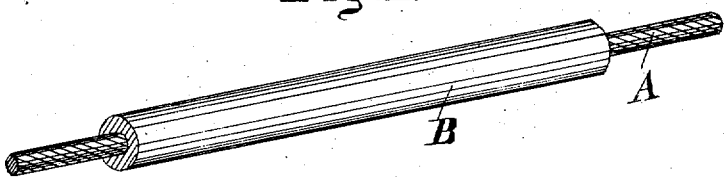

D. M. STEWARD.

ELECTRICAL INSULATOR.

No. 10,344. Reissued June 19, 1883.

Attest.
Joseph W Sims
F. C. Trowbridge

Inventor.
D. M. Steward
By John W Hill
Attorney

UNITED STATES PATENT OFFICE.

DEMETRIUS M. STEWARD, OF CINCINNATI, OHIO.

ELECTRICAL INSULATOR.

SPECIFICATION forming part of Reissued Letters Patent No. 10,344, dated June 19, 1883.

Original No. 271,994, dated February 6, 1883. Application for reissue filed May 1, 1883.

*To all whom it may concern:*

Be it known that I, DEMETRIUS M. STEWARD, a resident of Cincinnati, in the county of Hamilton and State of Ohio, have invented certain new and useful Improvements in Electrical Insulators, of which the following is a specification.

The object of my invention is the adaptation of vulcanized or hardened steatite or soapstone as a medium for covering electrical wires and other electrical apparatus for the purpose of insulation in the manner hereinafter fully described. For this purpose I either work the natural steatite from the original block into the desired form for covering or insulating a wire or other electric apparatus which is to be insulated, or I first reduce the natural steatite to a powder and then mix it with plaster-of-paris or other substance to form a bond, which, when in its plastic condition, is either applied direct to the apparatus to be insulated or is molded in proper form and then allowed to harden in the usual manner; but whether the steatite is formed from the original block into the desired shape or is first reduced to a powder, I propose to harden or vulcanize it by any convenient process—as, for instance, by treating it with ammonia and muriatic acid and subsequently heating it in an oven prior to applying it as an insulator. When the insulator is made direct from the solid original block it is first given the required form and finish and then vulcanized in the manner above described; and when, as for irregular forms or surfaces in dynamo-electric machines, the insulating-covering must be of necessity applied in a plastic state and allowed to harden in position, I first comminute the steatite from the original block, then harden or vulcanize it to an artificial lava, and then add to it sufficient cement—as plaster-of-paris—to form a bond before applying it to the designated surface. In either case, however, it is the vulcanized steatite which I propose to employ.

In order to distinguish natural steatite from the same substance after it has been vulcanized it is necessary that I point out the peculiar properties of each:

First. Natural steatite is soft, porous, brittle, and easily damaged by pressure or percussion. Vulcanized steatite is hard, (sufficiently so to cut glass,) non-porous, dense, of large cohesive power, and not easily damaged by pressure or percussion.

Second. Natural steatite is an absorbent of liquids, and is readily disintegrated by certain oils. Vulcanized steatite is a non-absorbent of liquids and resists the action of all liquids, acids, or gases, and will not yield to chemical decomposition.

Third. Natural steatite is easily cut and worked into any form with low-tempered tools—in fact it is of little greater hardness than prepared chalk. Vulcanized steatite can be cut by no instrument, and has a hardness nearly equal to the diamond. The comparison may be extended almost indefinitely, because the properties of the respective substances—natural steatite and steatite after it has been vulcanized—are as different and opposite as they are various.

My invention consists, first, in an insulator for electric wires or other electric apparatus of vulcanized steatite, which substance is first worked into the desired form from the natural block and then hardened, as above described; second, in an insulator for electric wires or other electric apparatus, of vulcanized steatite, which steatite is first reduced to a powder, then hardened, and finally, by mixture with sufficient plaster-of-paris or other cement to form a bond, is then applied to the surface to be insulated; third, in the process or method of preparing steatite for the purpose of insulating electrical apparatus by treatment with ammonia and muriatic acid in solution; and, finally, by heating the substance in a retort or oven.

Reference is to be had to the accompanying drawings, forming part of this specification, in which similar letters of reference indicate corresponding parts in all the figures.

Figure 2:
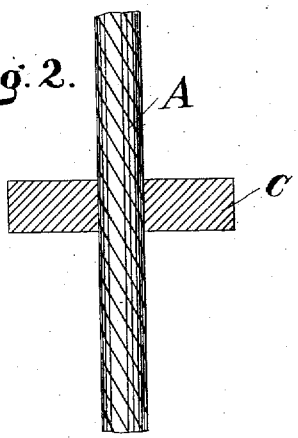
Figure 3:
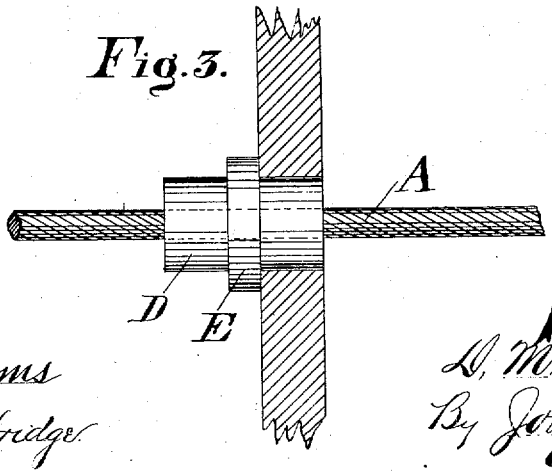

Figure 1 is a perspective view of a piece of wire or cable provided with my improved insulator. Fig. 2 is a cross-sectional elevation of an insulating-disk which is used to insulate a wire or cable at certain points; and Fig. 3 is a longitudinal elevation of an insulating-sleeve for insulating a wire in a door or window frame or casing.

In Fig. 1, A is the wire; B, the insulating-tube made of vulcanized steatite. In case the wire A, Fig. 2, must pass through a partition or the floor or a support, a ring, C, of vulcanized steatite, is secured in this floor or partition and the wire A is passed through this ring.

In place of the ring C a sleeve or collar, D, may be used, and this may be provided with a circular ridge, E, to hold it in proper position in a door or window casing, partition, &c.

The insulators made from the original block of steatite may be formed, cut, turned, or otherwise worked into any shape previous to vulcanization, and the insulators made of the previously powdered and vulcanized steatite may be pressed, molded, or worked into any desired shape and then permitted to harden in position by desiccation. The insulators made of vulcanized steatite are very hard and durable, are not affected by moisture, heat, or frost, oils, gases, acids, or other solvents, nor by any sudden change of temperature—as the heat of a burning building—and are thus far superior to glass and rubber insulators, for the former are very apt to break and the latter are expensive and liable to crack.

I am aware that powdered steatite in its natural state for insulating electric wires by incasing the wires in a tube of metal, and then ramming the comminuted steatite in the tube around and between the wires, is not novel, and that such an adaptation of the natural steatite is shown in the patent to P. B. Delany, of April 19, 1881, and this I do not claim.

Having described my invention, what I claim is—

1. An insulator for electric apparatus, consisting of vulcanized steatite which has first been cut or worked from the natural block into the desired form and then hardened or vulcanized, in the manner and for the purpose substantially as described.

2. An insulator for electric apparatus, consisting of vulcanized steatite which has first been reduced to powder from the natural substance, then vulcanized or hardened, and finally, by mixture with a suitable bond, applied to the desired surface to be insulated, for the purpose and in the manner substantially as described.

3. The process herein described of treating natural steatite to form vulcanized electrical insulators, consisting in treating it with ammonia and muriatic acid and then subjecting it to heat, substantially as described.

In testimony whereof I have signed my name to the foregoing specification in the presence of two subscribing witnesses.

DEMETRIUS M. STEWARD.

Witnesses:
JOHN W. HILL,
JOSEPH W. SIMS.